United States Patent [19]

Barrett, Jr. et al.

[11] Patent Number: 4,519,066

[45] Date of Patent: May 21, 1985

[54] DUPLEXER WITH SUM AND DIFFERENCE SIGNAL OUTPUTS

[75] Inventors: Raymond L. Barrett, Jr., Oakland Park, Fla.; Thomas A. O. Gross, Lincoln, Mass.

[73] Assignee: Sensormatic Electronics Corporation, Deerfield Beach, Fla.

[21] Appl. No.: 447,221

[22] Filed: Dec. 6, 1982

[51] Int. Cl.[3] ................................................ H04B 5/02

[52] U.S. Cl. ...................................... 370/24; 333/119; 340/572

[58] Field of Search .................. 370/24; 333/100, 119; 328/158, 159; 340/572; 324/140 R

[56] References Cited

U.S. PATENT DOCUMENTS 4,051,475 9/1977 Campbell ........................... 333/119

*Primary Examiner*—Joseph A. Orsino, Jr.

*Attorney, Agent, or Firm*—Robin, Blecker & Daley

[57] ABSTRACT

A duplexer is provided in which a transmit input signal is fed in parallel through two autotransformers to a pair of portal loops for establishing an interrogation field. Significantly lower voltage response signals returning via the autotransformers are applied in push-push relationship to the primary of one transformer for producing a difference signal output, and in parallel to a second transformer primary for producing a sum signal output. Back-to-back diodes across the secondary windings of the sum and difference output transformers limit the volt drop across the respective primaries for the relatively higher voltage transmit input signal. The response signal, however, is below the threshold of the diodes and, consequently, the diodes do not attenuate such signal.

6 Claims, 1 Drawing Figure

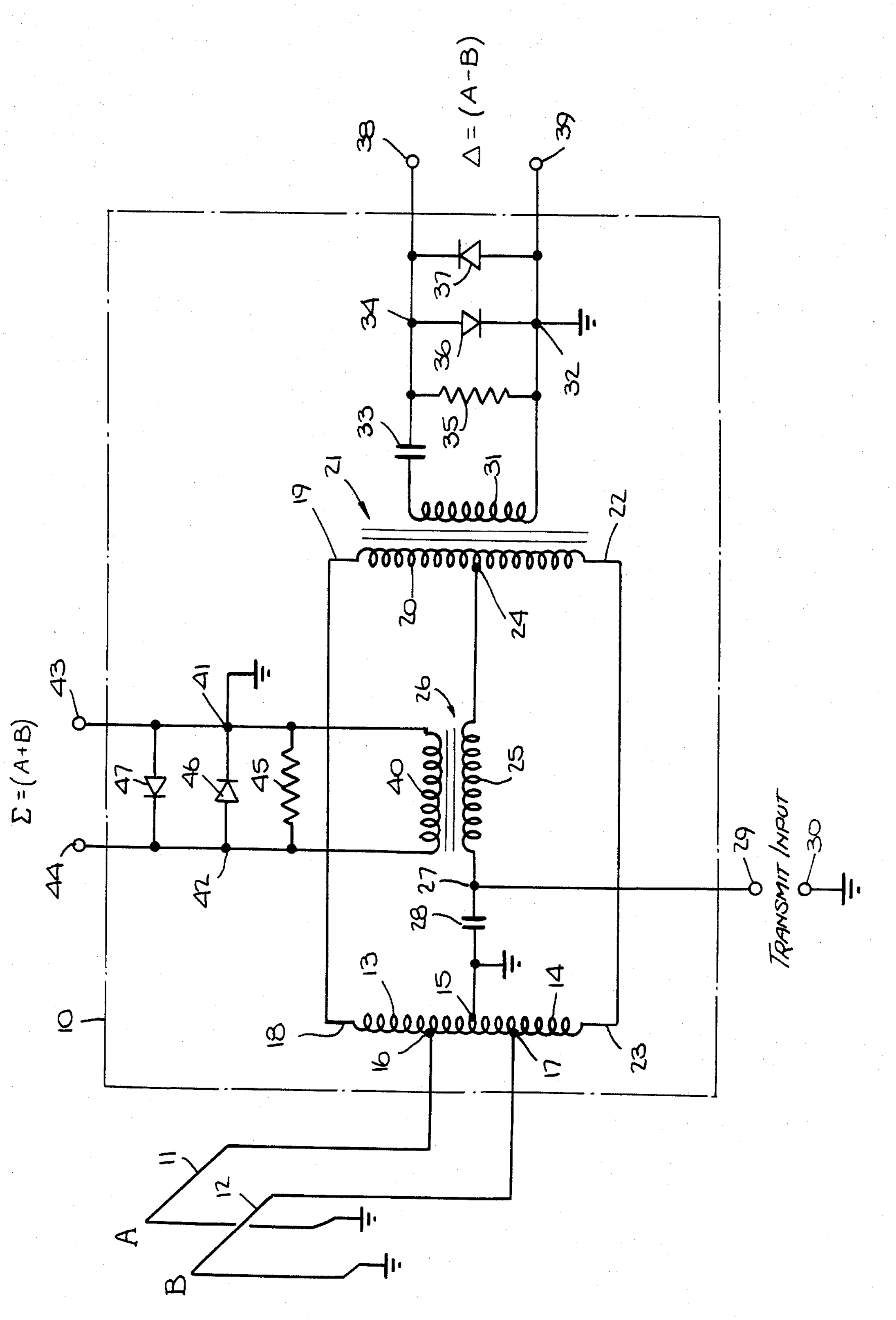
Δ = (A-B)
Σ = (A+B)
TRANSMIT INPUT
A
B
10
11
12
13
14
15
16
17
18
19
20
21
22
23
24
25
26
27
28
29
30
31
32
33
34
35
36
37
38
39
40
41
42
43
44
45
46
47

DUPLEXER WITH SUM AND DIFFERENCE SIGNAL OUTPUTS

BACKGROUND OF THE INVENTION

The present invention relates to bi-directional signalling and communication and, more particularly, to duplexing.

In the copending application of Raymond L. Barrett, Jr., Ser. No. 354,156 now U.S. Pat. No. 4,471,345 filed Mar. 5, 1982, for RANDOMIZED TAG TO PORTAL COMMUNICATION SYSTEM, and assigned to the same assignee as the present application, there is described a system whereby the whereabouts of personnel in a hospital or other facility is determined and stored through the interaction of identification tags and portal interrogating stations. Each individual to be monitored is provided with a unique identification tag, and each portal is provided with an encircling magnetic loop and associated circuitry for establishing communication with any tags that come within range. As described in said application, the portals are provided with single loops and infer that each time a tag comes within range it passes through. Although physical constraints can be applied to doorways and passageways so as to minimize detection of a tag unless it is being carried through, the need for such constraint is undesirable and individuals do, on occasion, change their mind. Preferably, the system should be direction sensitive so as to recognize on which side of the portal a tag is located regardless of prior history.

In the copending application of Henry F. Pfister, Ser. No. 413,612, filed Sept. 1, 1982, now U.S. Pat. No. 4,489,313 for SIGNAL DIRECTION DETERMINING SYSTEM AND DIRECTIONAL LOOP ANTENNA ARRAY THEREFOR, and assigned to the same assignee as the present application, there is described a system for using the signals from a pair of spaced open loops to provide directional information. The signals from the open loops are vectorially added and subtracted in a sum and difference circuit and the phase angle between the sum and difference signals is ascertained in a phase detector circuit that feeds an indicator. The so determined phase angle is either greater or less than 90° depending upon the relative magnitudes of the loop signals, which, in turn, is indicative of the direction to the signal source.

The present invention addresses itself to the problem of incorporating the direction determining system of said Pfister application in the system of said Barrett application. For this purpose it becomes necessary to provide a system whereby an interrogating signal can be communicated to and radiated by a pair of open loop antennas while avoiding loading of the signal by the direction determining and signal receiving apparatus. At the same time, the significantly weaker responses from identification tags must be operated on to provide the sum and difference components and passed efficiently to the direction determining and receiving components.

SUMMARY OF THE INVENTION

In accordance with one aspect of the present invention there is provided a duplexer for use in a signalling system wherein a first signal is to be transmitted in one direction through first and second coupling devices, and a second signal, distinguishable from said first signal, is to be received in the opposite direction through said coupling devices for communication to a first and second output, respectively, as the algebraic sum and difference of the components of said second signal that are received through each of said coupling devices, said duplexer comprising first and second transformation means for converting separate single ended transmission paths to one double ended path, means coupling said double ended path to said second output, means coupling said transformation means in parallel to said first output, means for coupling said first signal in parallel to said transformation means, means for coupling each of said coupling devices to said transformation means for providing separate single ended transmission paths to said transformation means, and means for limiting the absorption of power from said first signal by said first output.

BRIEF DESCRIPTION OF THE DRAWINGS

The invention will be better understood after reading the following detailed description of the presently preferred embodiment thereof with reference to the appended drawing in which:

The sole FIGURE is an electrical schematic diagram of the duplexer coupled to a pair of loop antennas in accordance with the invention.

DETAILED DESCRIPTION OF THE PREFERRED EMBODIMENT

Referring to the drawing there is shown within the phantom lined box 10 the duplexer and at 11 and 12 the pair of spaced open loops serving as antennas for the system. The loops 11 and 12 are designated arbitrarily as the "A" loop and "B" loop, respectively.

The duplexer 10 contains two autotransformer windings 13 and 14, each with one end terminal joined to an end terminal of the other at a junction 15 that is also connected to ground as a point of reference potential. The antenna loop 11 is connected between ground and a tap 16 on the winding 13 while the antenna loop 12 is connected between ground and a tap 17 on the winding 14. The free end terminal at 18 of autotransformer winding 13 is connected to one end or terminal 19 of the primary winding 20 of an output transformer 21. The opposite end or terminal 22 of winding 20 is connected to the free end or terminal 23 of autotransformer winding 14.

The transformer primary winding 20 has a centertap 24 that is connected through primary winding 25 of another output transformer 26 to a junction 27 with one terminal of a capacitor 28 whose other terminal is connected to ground and to the junction between the autotransformer windings 13 and 14 at 15. Junction 27 is also connected to an input terminal 29 that is associated with a second input terminal 30 that is connected to ground. The terminals 29 and 30 are provided for coupling to the duplexer the source (not shown) of signal to be transmitted or radiated by the loops 11 and 12. The terminals 29 and 30 are identified on the drawing as the "transmit input".

Transformer 21 has a secondary winding 31 with one end connected to a junction 32 that is connected to ground while the other end is connected through a capacitor 33 to a junction 34. Connected between junctions 32 and 34 are a resistor 35 and two semiconductor diodes 36 and 37 all connected in parallel and with the diodes connected with opposite polarity in back-to-back relationship. In addition, the junctions 32 and 34 are connected to output terminals 38 and 39, respectively.

The transformer 26 has a secondary winding 40 connected between junctions 41 and 42 with junction 41 connected to ground and to an output terminal 43. The junction 42 is connected to an output terminal 44. Connected between the junctions 41 and 42 are the resistor 45 and the two semiconductor diodes 46 and 47. The diodes 46 and 47 are oppositely poled in back-to-back relationship.

Each of the transformers 21 and 26 is a step-up transformer for providing voltage amplification for the weak response signals. The autotransformers also provide voltage step-up for signals received from the loop side. In a typical embodiment the signals induced in the loops A and B are on the order of nanovolts. If each loop is viewed as a single ended signal source relative to ground coupled in phase to respective terminals 16 and 17, the signal produced at terminal 18 will be in phase with that at terminal 23 relative to ground. However, as between terminals 18 and 23 the resultant signal can be considered as double-ended with that developed in winding 14 opposing that developed in winding 13. That is, the voltage between terminals 18 and 23 for signals applied to terminals 16 and 17 by loops 11 and 12 will be proportional to $(A-B)$. This voltage is applied to transformer 21 across its primary winding 20 which should be carefully balanced so as to provide an output voltage equal to $K_1(A-B)$ where $K_1$ is a constant based upon the parameters of the circuit. This output voltage appears at terminals 38 and 39 and is designated as the Δ output or difference output.

For received signals, the threshold voltage of the diodes 36 and 37 for forward conduction is selected to be greater than the maximum voltage appearing between junctions 32 and 34 for the range of anticipated signal levels detected by loops 11 and 12. Therefore, for received signals the diodes can be ignored. A typical diode is the type 1N277.

The circuit consisting of windings 13, 14, 20 and 25 with capacitor 28 can be thought of as resembling an impedance bridge. The first and second arms of the bridge are constituted, respectively, by the autotransformer windings 13 and 14. The centertapped primary winding 20 of transformer 21 provides the third and fourth arm of the bridge. The winding 25 and capacitor 28, in series, are connected between the diagonal terminals, namely points 15 and 24, of the bridge. However, the loops 11 and 12 are connected to windings 13 and 14 such that both cause current to flow in the same direction through winding 25 thereby providing at output terminals 43 and 44 a voltage proportional to $K_2(A+B)$ where $K_2$ is a constant of the circuit. This voltage is designated as the Σ output or sum output.

As with diodes 36 and 37, the diodes 46 and 47 are preferably of the same type having a threshold voltage in excess of the maximum received signal voltage. Thus, for received signals the diodes appear as a high impedance and can be ignored.

In the contemplated use of the subject duplexer, the frequency of the interrogation signal may be of the order of 25 kHz. The capacitor 28 is selected to tune to resonance at the interrogation frequency the inductance seen by the transmit input. It is assumed that the responding or received signal frequency will be substantially the same as that of the interrogation signal. Thus, for the sum signal channel the capacitor 28 performs the same tuning function as for the transmit input signal, and the received signal coupled through output transformer 26 sees, for the ideal case, an equivalent circuit load that is non-reactive. For received signals applied to the difference signal output through transformer 21 it is necessary that the received signals see here also a non-reactive load. The capacitor 33 provides the requisite tuning for this purpose and introduces a phase correction to the difference signal so that the phase relationship between the sum and difference signals properly indicates whether signal A or signal B is the larger.

While the response signals induced in loops 11 and 12 are in the nanovolt range, the transmission or interrogation signals are orders of magnitude larger. The signal is fed into the diagonal of the bridge across capacitor 28 and the full current passes through winding 25 of output transformer 26. The voltage induced in secondary winding 40, after step-up by the transformer, would ordinarily be well above the threshold voltage of diodes 46 and 47. But the diodes conduct in the forward direction and clamp the voltage between terminals 43 and 44 to a very low value. If the primary and secondary windings of transformer 26 are tightly coupled, the volt drop across primary winding 25 will be held to a very small value and substantially all of the transmit input voltage will appear across autotransformers 13 and 14. Consequently, negligible power will be absorbed by the sum signal output from the transmit input signal.

After passing through winding 25, the interrogating signal currents divide equally through each half of winding 20 of transformer 21 and pass through windings 13 and 14 to induce in phase signals in loops 11 and 12. At the same time, the net voltage across winding 20 should be zero or close to zero preventing any voltage from being induced in winding 31. However, should there exist any circuit imbalance, the diodes 36 and 37 will limit the power absorbed by the secondary winding 31 and its interconnected circuitry.

Recapitulating, the autotransformer windings 13 and 14 are coupled in parallel to the output transformer 26, while the transmit input and any signal coupled thereto is coupled in parallel to the two windings 13 and 14. The autotransformers constitute transformation means and the duplexer comprises a bridge-like circuit with the autotransformers representing two of the arms. The centertapped winding 20 provides the other two arms of the bridge.

It should be evident that for interrogation signals, some component of a clipped signal will propagate beyond the output terminals. In fact, a little thought will reveal that the received signal will always be of lesser magnitude than the transmit signal. In the absence of the transmit signal, the diodes will be non-conductive and have no effect.

Transmit input signal will be of relatively high voltage and will cause the diodes to conduct. The overall system, however, need only be arranged such that transmission and reception cannot occur simultaneously. That is, the receiver should be disabled when the transmitter is transmitting and vice versa. The details, however, form no part of the present invention.

The resistors coupled across the secondary windings of the output transformers are selected to establish the desired Q of the sum and difference channels.

Having described the present invention with reference to the presently preferred embodiment thereof, it will be apparent to those skilled in the subject art that various changes in construction can be introduced without departing from the true spirit of the invention as defined in the appended claims.

What is claimed is:

1. A duplexer for use in a signalling system wherein a first signal is to be transmitted in one direction through first and second coupling devices, and a second signal, distinguishable from said first signal, is to be received in the opposite direction through said coupling devices for communication to a first and second output, respectively, as the algebraic sum and difference of the separate components of said second signal that are received, respectively, through each of said coupling devices, said duplexer comprising in combination first and second transformation means for converting separate single ended transmission paths to one double ended path, means for coupling said double ended path to said second output, means for coupling said first and second transformation means in parallel to said first output, means for coupling said first signal in parallel to said transformation means, means for coupling each of said coupling devices to said transformation means for providing separate single ended transmission paths to said transformation means, and means for limiting the absorption of power from said first signal by said first output.

2. A duplexer according to claim 1, characterized in that said first and second transformation means comprise a first and second transformer, respectively, each transformer having primary and secondary terminals, said primary terminals being coupled, respectively, to a different one of said coupling devices, one of the secondary terminals of said first transformer being coupled to one of the secondary terminals of said second transformer, the secondary windings of said transformers being poled such that the signals developed between the other of said secondary terminals in response to said second signal components corresponds to said algebraic difference.

3. A duplexer according to claim 2, characterized in that said transformers are autotransformers.

4. A duplexer for use in a signalling system wherein a pair of loops is used to radiate an interrogating signal and to receive a weaker response signal, and said response signal is operated upon by the duplexer to produce at separate outputs a sum and a difference signal, respectively, said duplexer having a first input for coupling to a source of said interrogating signal, means for coupling said first input to said pair of loops in parallel for energizing said loops in phase, two separate outputs, means for combining currents additively from said pair of loops and supplying a sum signal to one of said separate outputs, means for combining currents subtractively from said pair of loops and supplying a difference signal to the other of said separate outputs, and means for limiting the absorption of power from said interrogating signal by said separate outputs.

5. A duplexer for use in a signalling system wherein a first signal is to be transmitted in one direction through first and second coupling devices, and a second signal, distinguishable from said first signal, is to be received in the opposite direction through said coupling devices for communication to a respective first and second output as the algebraic sum and difference of the separate components of said second signal that are received, respectively, through each of said coupling devices, said duplexer comprising a bridgelike circuit having first and second autotransformers connected in series as a first and second arm of said bridge, an output transformer with a centertapped primary connected as the third and fourth arm of said bridge with the end terminals of said primary connected, respectively, to the end terminals of said first and second autotransformers, a second output transformer having a primary winding connected between said centertap and the junction between said first and second autotransformers, means for connecting one of said coupling devices between said junction and a tap on said first autotransformer, means for connecting the other of said coupling devices between said junction and a tap on said second autotransformer, means for coupling said first signal in series with said primary winding of said second output transformer, and means for limiting the transfer from the primary to the secondary winding of said second output transformer of power from said first signal, said first and second output transformers providing said second and first outputs, respectively.

6. A duplexer according to claim 5, characterized in that said means for limiting the transfer of power from said first signal comprises a pair of parallel, oppositely poled, semiconductor rectifiers connected across the terminals of the secondary winding of said second output transformer.

* * * * *